United States Patent [19]

Prosenbauer

[11] Patent Number: 4,535,504
[45] Date of Patent: Aug. 20, 1985

[54] DEVICE FOR SEVERING THE MEAT ADHERING TO BONES FROM THESE BONES

[75] Inventor: Otto Prosenbauer, Vienna, Austria

[73] Assignee: Inject Star Pokelmaschinen Gesellschaft m.b.H., Vienna, Austria

[21] Appl. No.: 657,033

[22] Filed: Oct. 1, 1984

Related U.S. Application Data

[63] Continuation of Ser. No. 404,172, Aug. 2, 1982, abandoned.

[30] Foreign Application Priority Data

Aug. 4, 1981 [AT] Austria .................................. 3442/81

[51] Int. Cl.³ ............................................. A22C 17/00
[52] U.S. Cl. ......................................... 17/1 G; 17/46
[58] Field of Search ................... 17/1 G, 46; 241/69, 241/74

[56] References Cited

U.S. PATENT DOCUMENTS 4,025,985  5/1977  Rousseau ............................... 17/1 G
4,303,206  12/1981  Prince et al. ...................... 241/74 X

FOREIGN PATENT DOCUMENTS 1066902  10/1959  Fed. Rep. of Germany ....... 17/1 G

OTHER PUBLICATIONS 2,016,258, Van Baalen, U.K. patent application, published Sep. 26, 1979.

Primary Examiner—Willie G. Abercrombie
Attorney, Agent, or Firm—Townsend and Townsend

[57] ABSTRACT

A device for severing the meat adhering to bones by compressing the bones having meat adhering thereto has a press cavity having an upright axis, a filling cavity arranged above the press cavity and an abutment arranged beside this filling cavity. The press cavity has a side wall provided with openings through which the pressed, paste-like meat can pass, while the bones cannot. The abutment and the filling cavity can be moved together transversely to the direction of the axis of the press cavity, so that the mass of meat and bones to be compressed can fall from the filling cavity into the press cavity, when the filling cavity is brought into a position in which it aligns with the press cavity. When the press cavity is tightly closed by the abutment, the mass of meat and bones can be pressed by a piston.

11 Claims, 2 Drawing Figures

DEVICE FOR SEVERING THE MEAT ADHERING TO BONES FROM THESE BONES

BACKGROUND OF THE INVENTION

This application is a continuation of application Ser. No. 404,172, filed Aug. 2, 1982, now abandoned.

The invention relates to a device for severing the meat adhering to bones from these bones by compressing the bones with the adhering meat within a press cavity having an upright axis, a compressing piston being insertable into the press cavity from below and the press cavity being closeable on its upper end by an abutment for the compression, the wall of the press cavity having openings for the passage of the meat mass being given a pasty condition under the action of the compressing pressure but being impermeable for the bones. Further a filling cavity for the mass of meat and bones to be compressed is provided, said filling cavity being arranged for being moved transversely to the axis of the press cavity between a filling position located remote from the axis of the press cavity and a discharge position located at the area of the axis of the press cavity, in which discharge position the mass to be compressed falls from the filling cavity into the press cavity after having removed the abutment.

If in this connection it is said "meat", flesh of any kind is meant, may it be from cattle or pork or fish or poultry or the like.

THE STANDARD OF ART

In the known device of this type, two rings are arranged above the press cavity and one above the other for being swivelled around separate axes. If these rings have been brought in a coaxial position relative to the axis of the press cavity, a further piston forming the abutment is inserted from above into both rings until the bottom end surface of this further piston tightly closes the press cavity at its upper end. After having completely pressed the mass of meat and bones, this piston is again lifted and the press piston is shifted in upward direction to such an extent that the residual mass of bones is shifted into the lower one of both rings. This ring is subsequently swivelled around its associated axis, so that the residual mass of bones is removed out of the area of the press cavity by laterally shifting this ring and falls out of the ring in downward direction after having passed a supporting surface. Simultaneously, the upper one of the rings, forming the filling cavity, is brought in its filling position and filled there with mass of meat and bones to be compressed, which is prevented from falling out of the ring by a plate, on which the ring slides. Subsequently, this ring is moved around its pivotal axis back into its discharging position being coaxial to the axis of the press cavity, whereby the ring slides off the plate and the bones together with the adhering meat contained with this ring fall into the press cavity through the other ring after the compressing piston has again been retracted. As soon as both rings again assume a coaxial position relative to the axis of the press cavity, a new working cycle is started by lowering the piston forming the press abutment. The pasty mass of meat emerging from the openings within the wall of the press cavity during the compression operation is collected and fed to a further processing step.

It is a disadvantage of this known device that this device is of expensive construction and requires a great space and that the control for both pivotable rings as well as for the axial movement of the abutment-piston is also expensive. Furthermore, the known device suffers from operational disturbances because the mass to be compressed forms bridges when it falls into the press cavity.

SUMMARY OF THE INVENTION

It is an object of the invention to avoid these drawbacks and to improve a device of the initially described type such that the device becomes substantially simplified.

It is a further object of the invention to make the device safer in operation.

It is still another object of the invention to make the device more compact.

It is again a further object of the invention to reduce the height of fall for the mass to be compressed.

The invention solves this task, based on a device of the initially described type, by the feature that the abutment is moveable in the same plane as the filling cavity and in transverse direction to the axis of the press cavity, and that the filling space adjoins the press cavity in its discharge position. In this manner the abutment and the filling cavity are moved within the same plane thus only requiring two movements for the abutment and for the filling cavity in transverse direction to the axis of the press cavity, whereas one can do without any movement of a counter piston in axial direction of the press cavity. Furthermore, there results the advantage that the height of fall for the mass to be compressed when it falls from the filling cavity into the press cavity becomes reduced, so that the danger of formation of bridges and, respectively, jamming of bones is also reduced. The ejecting movement for the compressed mass of bones can, as is desired, be effected by the filling cavity moved in direction to or by the abutment moved in direction away from the axis of the press cavity.

According to a further development of the invention, the abutment and the filling cavity are shiftable along a common straight guide means in normal direction to the axis of the press cavity, the filling cavity and the abutment being rigidly connected one with the other. Straight guide means show less expenditure when compared with the pivotal support of the initially described known device and further show the advantage that the device is relieved from rocking moments. If, according to a preferred embodiment of the invention, a common drive means is provided for shifting the abutment and the filling cavity rigidly connected to this abutment, the expenditure for moving moveable constructional parts is still further reduced to one additional drive means in addition to the drive means for the compressing piston.

According to a preferred construction according to the invention, the abutment and the filling cavity are formed of two hollow cylinders of preferably equal dimensions, the hollow cylinder forming the abutment having at its bottom end surface a rigid bottom wall whereas the hollow cylinder defining the filling cavity has an open bottom end. This filling cavity slides on a supporting plate laterally adjoining the upper front end of the press cavity. This supporting plate prevents the mass to be compressed from falling out of the filling cylinder as long as this filling cylinder has not reached a coaxial position relative to the press cylinder.

For facilitating ejection of the compressed bone parcel the arrangement is, according to a further development of the invention, such that both hollow cylinders are maintained at a distance one from the other at least corresponding to the internal diameter of the press cavity and that an ejecting collar is arranged at the bottom end of the hollow cylinder forming the filling cavity and at the side facing the other hollow cylinder. This ejecting collar has the task to shift the compressed bone parcel in front of itself when the filling cylinder is moved into its coaxial position relative to the axis of the press cavity whereby the bone parcel is conveniently shifted to a chute via which the compressed bone parcel falls into a container.

The arrangement could be such that the bottom edge of the abutment as well as of the filling cylinder is just in closing contact with the upper edge of the press cavity or its wall, respectively. This would, however, cause sealing problems so that it is, according to the invention, more favourable if the wall of the press cavity can be lifted into sealing engagement with the abutment in that position of the abutment in which it closes the press cavity. For effecting this lifting movement, a separate hydraulically actuated piston being independent from the hydraulically actuated compressing piston can be provided, the piston rod of which is connected with an annular plate carrying the wall of the press cavity and surrounding the compressing piston.

BRIEF DESCRIPTION OF THE DRAWINGS

The device according to the invention is schematically illustrated in the accompanying drawings with reference to an example of embodiment shown in two different operating positions.

FIG. 1 shows in its right-hand portion a vertical cross section through the device and a side elevation in its left-hand half, the filling cavity assuming the filling position whereas

DESCRIPTION OF THE PREFERRED EMBODIMENT

Figure 1:
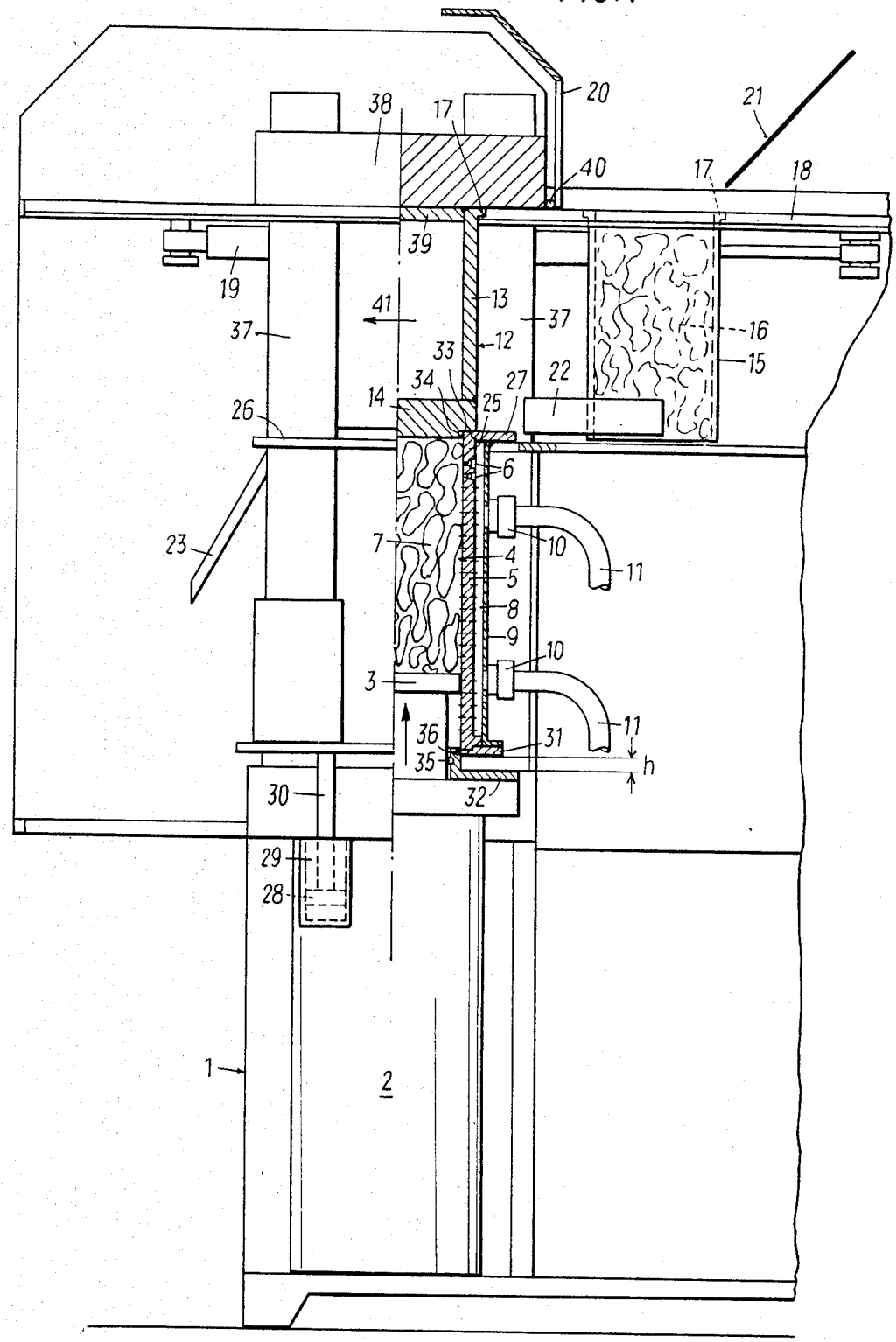

The device has a frame 1 within which a hydraulic cylinder 2 is fixed with its axis assuming vertical position. Within this cylinder 2, a compressing piston 3 can be reciprocated and the compressing piston enters a press cavity 4 having a vertical axis from beneath the press cavity. The wall 5 of the press cavity 4 has an annular circular cross section and is provided with a plurality of small openings 6 only two of which are shown for simplicity. These openings 6 allow the meat portions of the mass 7 of meat and bones, which meat has been brought into a pasty condition within the press cavity 4 by the pressure of the compressing piston 3, to pass therethrough, but retain the bones within the press cavity. The mass of meat having been brought into a pasty condition is collected within an annular space 8 between the outer mantle of the wall 5 and a tube 9 and is discharged via connection pieces 10 extending through the tube 9 and having hoses 11 connected thereto.

During pressing operation, an abutment member 12 provides the required support for the compressed mass. This abutment member 12 is formed of a hollow cylinder 13 and a rigid bottom wall 14 closing the bottom end of this cylinder.

A further hollow cylinder 15 is arranged laterally of the abutment member 12 and formed of a tube having an open top end and an open bottom end and forming with its internal space a filling cavity 16 for the bones with adhering meat to be compressed. Said both hollow cylinders 13, 15 are located at such a distance one from the other that the clear distance between their outer mantle surfaces is at least as great as the internal diameter of the press cavity 4. Both hollow cylinders 13, 15 are guided at both sides along straight guide means 18 by laterally extending flanges 17 provided at its upper edges and can be shifted along these guide means 18 by means of hydraulic cylinders 19, the hollow cylinders 13, 15 being fixed to the piston rods (not shown) of these cylinders 19 at a fixed distance one from the other. By means of these cylinders 19, the hollow cylinders 13, 15 can alternately be brought with their axes in a coaxial position relative to the press cavity 4. In this manner, the hollow cylinder 15 defining the filling cavity 16 can be reciprocated between the filling position of FIG. 1, in which this hollow cylinder is located below a filling hopper 21 closeable by a cover 20, and the discharge position shown in FIG. 2, in which the hollow cylinder 15 is in alignment with the axis of the press cavity 4. In an analogous manner, the hollow cylinder 13 can be shifted from the position shown in FIG. 1, in which this hollow cylinder forms the abutment during compressing the mass to be compressed, into the inactive position shown in FIG. 2, which is remote from the axis of the press cavity 4. The hollow cylinder 15 carries at its side facing the hollow cylinder 13 an ejecting collar 22 being formed of a bent plate, both ends of which are fixed to the hollow cylinder 15 and the center portion of which is curved in correspondence with the radius of the press cavity 4. This ejecting collar 22, during shifting the hollow cylinder 15, engages the compressed bone parcel shifted out of the press cavity 4 in upward direction by the compressing piston and shifts this bone parcel via a chute 23 into a bone collecting carriage 24. For preventing the mass to be compressed and having been introduced into the filling cavity 16 from the filling hopper 21 from downwardly falling out of the filling cavity prior to having brought the hollow cylinder 15 in a coaxial position relative to the press cavity 4, a supporting plate 26 laterally adjoining the upper front end 25 of the press cavity 4 is provided extending from the wall 5 of the press cavity 4 at least at a position below the filling hopper 21. The supporting plate 26 has a continuation at the other side of the press cavity 4 and serves there as a support means for the bone parcel shifted by the ejecting collar 22. An annular portion 27 surrounding the wall 5 is cut out of the supporting plate 26 and fixed to the wall 5 and to the tube 9 and is arranged for being lifted together with these component parts by means of a hydraulically actuated piston 28 which is guided within a hydraulic cylinder 29 fixed to the frame 1 and having its piston rod 30 fixed to an annular plate 31 carrying the wall 5 and surrounding the compressing piston 3. This annular plate 31 can be moved for the stroke h (FIG. 1) from the lowermost end position shown in FIG. 2 in which the annular plate 31 rests on the upper end 32 of the cylinder 2 into the position shown in FIG. 1. This provides the possibility to press the upper end surface 25 of the wall 5 into sealing engagement with the bottom wall 14 of the abutment 12, noting that for improving the sealing action the bottom wall 14 has on its outer mantle surface a circumferential extending recess 33 within which a O-ring 34 is located. Sealing engagement at the bottom end of the press cavity 4 is effected by an O-ring 35 inserted into the end surface 32 and sealing this end surface relative to the compressing piston 3 as well as by an O-ring 36 inserted into a bottom flange of the wall 5 and engaging the inner mantle surface of the tube 9.

The compressing pressure acting during pressing operation of the abutment 12 is transmitted via the hollow cylinder 13 to a cross-piece 38 fixed on collars 37 of the frame. An end plate 39 may be inserted into the upper end of the hollow cylinder 13 for stiffening purposes.

Figure 2:
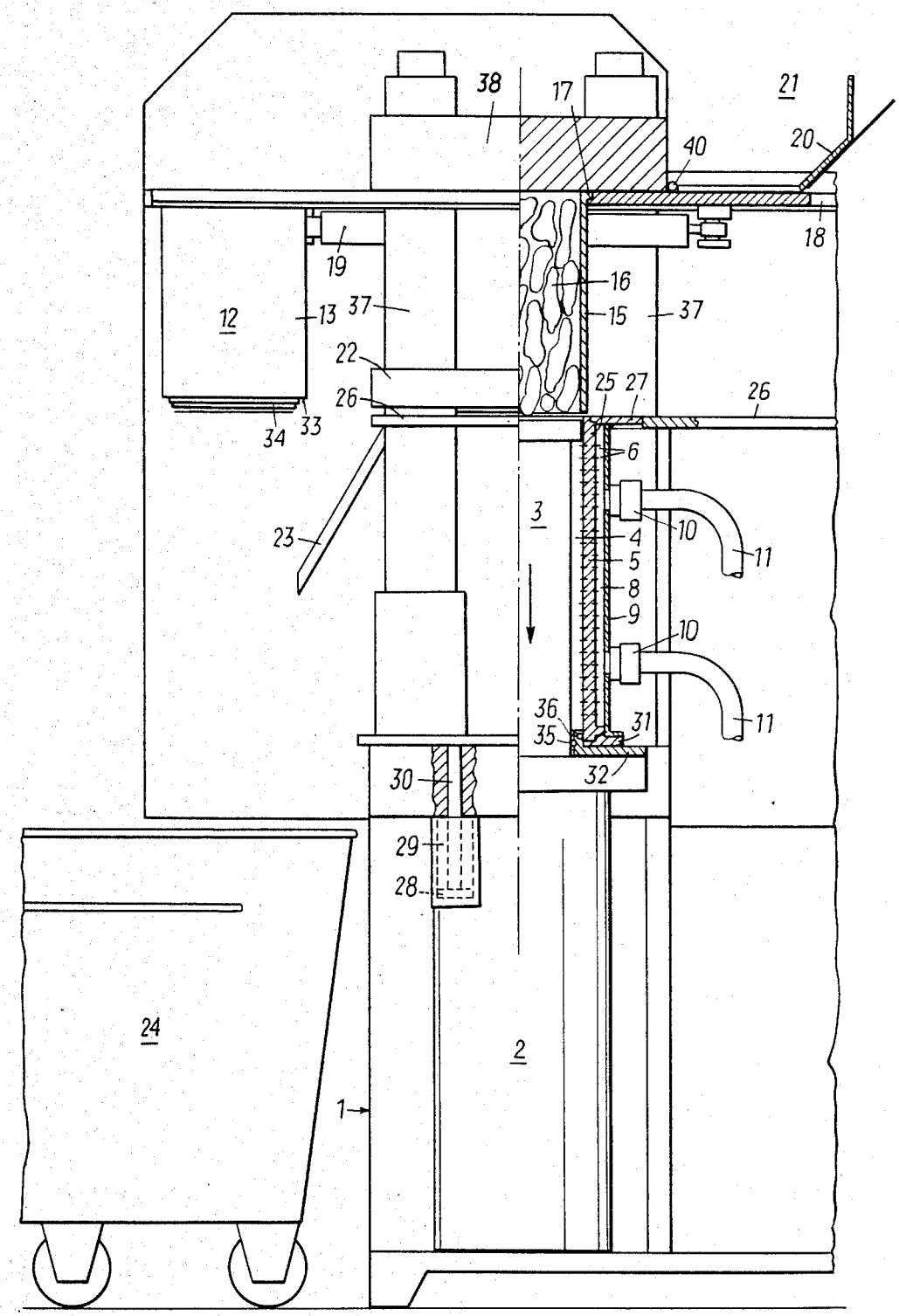
FIG. 2 shows in a similar manner, the same device with the filling space in discharge position.

The manner of operation of the device is as follows: the bones to be compressed and having meat adhering thereto are, with the filling cavity 16 assuming the position shown in FIG. 1, thrown into the filling hopper 21 and fall into the hollow cylinder 15. As soon as the filling cavity 16 is filled, the cover 20 is closed, noting that its closed position is supervised by an end switch 40 being interconnected into the electrical circuitry for the hydraulic drive such that the hydraulic drive can be only activated with the cover 20 assuming its closed position. While filling the filling cavity 16, the mass to be compressed and located within the press cavity 4 is compressed by the pressure-actuated compressing piston 3, the meat components having a pasty condition emerging from the openings 6 into the annular gap 8 and being fed to subsequent processing via the hoses 11. The abutment 12 provides the counterpressure required for the pressing operation. As soon as the pressing operation has been terminated, the compressing piston 3 is relieved of pressure and the annular plate 31 is, together with the wall 5 carried by this plate, lowered by correspondingly actuating the hydraulic cylinder 29. This action frees the bottom end surface 14 of the hollow cylinder 13 so that this hollow cylinder can be moved from its aligned position with the axis of the press cavity 4 in direction of the arrow 41 to the chute 23 and the upper end of the press cavity 4 is given free. Simultaneously, the hollow cylinder 15 is shifted in left-hand direction and in direction of the arrow 41 for the same path. As soon as the upper end surface of the press cavity 4 is free, the compressing piston 3 is lifted so that the residual compressed mass of bones having the shape of a parcel is shifted out of the press cavity 4 in upward direction. As soon as the residual mass is completely shifted out of the press cavity 4, both hollow cylinders 13, 15 are further shifted in left-hand direction (FIG. 1) and in direction of the arrow 41 by correspondingly actuating the cylinder 19 until these hollow cylinders have reached the end position shown in FIG. 2. Thereby, the parcel of residual bones is shifted in direction of arrow 41 on the supporting plate 26 by the ejecting collar 22 and falls via the chute 23 into the bone collecting carriage 24. As soon as the axis of the hollow cylinder 15 has reached a position in alignment with the axis of the press cavity 4, the compressing piston 3 is again lowered and the mass of bones and meat located within the filling space 16 falls into the press cavity. Subsequently, both hollow cylinders 13, 15 are returned into the position shown in FIG. 1 and the hydraulic cylinder 29 is pressurized so that the press cavity 4 is at its top area again sealed relative to the abutment 12. A further working cycle can now be started by pressurizing the compressing piston 3 and opening the cover 20 as well as by filling the filling cavity 16.

For cleaning the press cavity 4, the hollow cylinders 13, 15 are first loosened from their drive rods and removed. Subsequently the annular plate 31 is lifted by means of the hydraulic cylinder 29, what is possible in a manner exceeding the stroke h shown in FIG. 1, because there is no abutment counteracting anymore. As soon as the wall 5 has been lifted to such an extent that its bottom edge has passed beyond the top edge of the compressing piston 3, the wall 5 together with the tube 9 can be swivelled laterally. For this purpose, the wall 5 together with the tube 9 is fixed to a pivoting arm, not shown, being pivotable in a horizontal plane around one of the columns 37.

What is claimed is:

1. A device for severing meat adhering to bones from these bones by compressing the bones with the adhering meat within a press cavity having an upright axis, comprising a compressing piston being insertable into said press cavity from below and being movable within the cavity along said axis, an abutment member for closing the press cavity at its upper end during compressing the bones, said abutment member being arranged for being moved transversely to the axis of said press cavity between a position above the press cavity and a position remote thereof, a cylindrical side wall in said press cavity extending over the length of the cavity generally parallel to said axis, the side wall having openings oriented transversely to said axis for the passage of a meat mass being given a pasty condition under the action of the compressing pressure and being impermeable for the bones, a filling member having a filling cavity for the mass of meat and bones to be compressed, and filling member being arranged for being moved transversely to the axis of said press cavity between a filling position located remote from the axis of said press cavity and a discharge position located at the area of the axis of said press cavity, said mass to be compressed falling from the filling cavity into the press cavity after having removed from said position above the press cavity said abutment member, said abutment member and filling member being movable in the same plane, said filling cavity directly adjoining said press cavity in the discharge position of said filling cavity.

2. A device as claimed in claim 1, further comprising a straight guide means for guiding said abutment member and said filling member and extending perpendicularly to the direction of the axis of said press cavity, said filling member and said abutment member being rigidly connected one with the other.

3. A device as claimed in claim 2, wherein a common drive means is provided for shifting said abutment member and said filling member.

4. A device as claimed in claim 2, wherein said abutment member and said filling member are formed of two hollow cylinders, the hollow cylinder forming the abutment member having a bottom end surface formed by a rigid bottom wall, whereas the hollow cylinder defining the filling member has an open bottom end and slides on a supporting plate laterally adjoining the upper front end of said press cavity.

5. A device as claimed in claim 4, wherein said both hollow cylinders are of equal size.

6. A device as claimed in claim 4, wherein said both hollow cylinders are maintained at a distance one from the other at least corresponding to the internal diameter of said press cavity, an ejecting collar being provided arranged at the bottom end of said hollow cylinder defining the filling member and at the side thereof facing the other hollow cylinder forming the abutment member.

7. A device as claimed in claim 4, further comprising guide means for laterally guiding both hollow cylinders at their upper edges, and a cross-piece of said frame contacting the hollow cylinder forming the abutment member in its coaxial position relative to said press cavity.

8. A device as claimed in claim 1, further comprising a lifting means for lifting said wall of the press cavity in sealing engagement with said abutment member, when the abutment member assumes the position closing the press cavity.

9. A device as claimed in claim 8, wherein said lifting means for lifting the wall of the press cavity comprise a separate hydraulically actuated piston being independent from said compression piston and having a piston rod connected to an annular plate carrying said wall of the press cavity and enclosing said compression piston.

10. Apparatus for severing meat adhering to bones from such bones by compressing the bones with the adhering meat within a press cavity having an upright axis, the apparatus comprising a cylindrical side wall defining the cavity, a piston insertable into said press cavity from below and movable within the cavity along said axis, an abutment member for closing the press cavity at its upper end during compression of the bones, said abutment member being movable transversely to the axis of said press cavity between a position in registration with the press cavity and a position remote thereof, the side wall having openings oriented transversely to said axis and distributed over a substantial portion of the length of the side wall for the passage of a meat mass being given a pasty condition under the action of the compression pressure generated by the piston when it is moved toward the abutment member, the openings being impermeable for the bones, a filling member having a filling cavity for meat and bones to be compressed, and filling member being movable transversely to the axis of said press cavity between a filling position located remote from the axis of said press cavity and a discharge position located at the area of the axis of said press cavity so that the filling cavity directly adjoining said press cavity in the discharge position of said filling cavity and the meat and bones to be compressed can fall from the filling cavity into the press cavity after removal of the abutment member from said position above the press cavity, and straight guide means operatively coupled with the abutment member and the filling member and extending substantially perpendicularly to the axis of the press cavity for guiding movements of the abutment member and the filling member in a common plane.

11. Apparatus for separating meat adhering to bones from the bones by compressing bones with the adhering meat in an upright cavity having a longitudinal, upright axis, the apparatus comprising a compression cylinder concentric with the axis having a plurality of generally radially oriented openings communicating the cavity with an exterior of the cylinder and formed to prevent the passage of bones therethrough; a compression piston reciprocably movably disposed within the cylinder for movement from a first, lower end to a second, upper end of the cylinder; an abutment member for closing the second end of the cylinder; means for moving the abutment member to the cavity axis into and out of registration with the cylinder so as to alternatively close and open the second cylinder end; a filling member for receiving and holding a mass of meat and bones to be compressed and disposed generally above the compression cylinder; means for moving the filling member into and out of registration with the compression cylinder; means for closing a lower end of the filling member when the filling member is out of registration with the cylinder and for opening the filling member when it is in registration with the cylinder, so that the filling member when filled with the mass of meat and bones gravitationally discharges the mass into the cylinder when in registration therewith; means for forcing the piston during a power stroke from the first end towards the second end while the abutment member is in registration with the cylinder to thereby compress the mass of bone and meat in the cylinder, give the meat of the mass a pasty condition and force it through the openings to the exterior of the cylinder for further use while the bone in the mass is retained within the cavity; and means for removing the bones from the cavity at the end of the power stroke, whereby the reciprocal movement of the piston within the cylinder and the transverse movement of the abutment member relative to the second cylinder end removes portions of the mass of bones and meat which may adhere to the cylinder and the abutment member to facilitate the unimpeded operation of the apparatus.

* * * * *